United States Patent
Paetz-Lauter et al.

(10) Patent No.: US 9,174,363 B2
(45) Date of Patent: Nov. 3, 2015

(54) EXTRUSION EXPANSION OF LOW MOLECULAR WEIGHT POLYALKYLENE TEREPHTHALATE FOR PRODUCTION OF EXPANDED BEADS

(75) Inventors: Karl Paetz-Lauter, Nottuln (DE); Jie Li, Zofingen (CH); Mika Meller, Jarvenpaa (FI)

(73) Assignee: ARMACELL ENTERPRISE GMBH & CO., Schoenefeld OT Waltersdorf (DE)

(*) Notice: Subject to any disclaimer, the term of this patent is extended or adjusted under 35 U.S.C. 154(b) by 354 days.

(21) Appl. No.: 13/605,525

(22) Filed: Sep. 6, 2012

(65) Prior Publication Data
US 2013/0059938 A1 Mar. 7, 2013

(30) Foreign Application Priority Data
Sep. 7, 2011 (EP) .................... 11180461

(51) Int. Cl.
*C08G 63/183* (2006.01)
*C08J 9/16* (2006.01)
*B29B 9/06* (2006.01)
*C08J 9/34* (2006.01)
*B29B 9/14* (2006.01)
*C08J 9/14* (2006.01)
*B29B 9/12* (2006.01)

(52) U.S. Cl.
CPC . *B29B 9/065* (2013.01); *B29B 9/14* (2013.01); *C08J 9/141* (2013.01); *C08J 9/34* (2013.01); *B29B 2009/125* (2013.01); *C08J 2201/03* (2013.01); *C08J 2203/14* (2013.01); *C08J 2367/02* (2013.01); *Y10T 428/2998* (2015.01)

(58) Field of Classification Search
CPC .................. C08J 9/34; C08J 9/16; C08J 9/18; C08J 9/20
See application file for complete search history.

(56) References Cited

U.S. PATENT DOCUMENTS

| | | | | |
|---|---|---|---|---|
| 5,783,610 A | * | 7/1998 | Fukushima et al. | 521/51 |
| 6,306,921 B1 | * | 10/2001 | Al Ghatta et al. | 521/182 |
| 2002/0168509 A1 | * | 11/2002 | DeSimone et al. | 428/310.5 |
| 2011/0171456 A1 | | 7/2011 | Weidinger et al. | |

FOREIGN PATENT DOCUMENTS

| | | |
|---|---|---|
| DE | 102010026926 A1 | 2/2011 |
| EP | 0866089 A1 | 9/1998 |
| WO | WO 2011063806 A1 * | 6/2011 |

OTHER PUBLICATIONS

Eaves, D.: Handbook of Polymer Foams, Rapra Technology, 2004, pp. 37-47, 173-185 and 195-200.
Britton, R : Update on Mouldable Particle Foam Technology, Smithers Rapra, 2009, pp. 7-11 and 51-65.
Pielichowski, K.,et al: Thermal Degradation of Polymeric Materials, Rapra Technology Limited, 2005, pp. 47.
Scheirs, J. , et al: Modern Polyesters: Chemistry and Technology of Polyesters and Copolyesters, John Wiley & Sons, 2003, pp. 35-36.

* cited by examiner

*Primary Examiner* — Randy Gulakowski
*Assistant Examiner* — Christina Wales
(74) *Attorney, Agent, or Firm* — Rothwell, Figg, Ernst & Manbeck, P.C.

(57) ABSTRACT

An extrusion expansion of low molecular weight polyalkylene terephthalates having an IV of below 1.0 dl/g to produce gas-charged beads is disclosed. The process includes an extrusion expanding of the resins and an underwater pelletizing of the melt threads. The obtained beads show a composite structure and are characterized by an IV of 0.69 dl/g or more and a melt viscosity $\eta_0$ of higher than 300 Pa·s.

10 Claims, No Drawings

EXTRUSION EXPANSION OF LOW MOLECULAR WEIGHT POLYALKYLENE TEREPHTHALATE FOR PRODUCTION OF EXPANDED BEADS

CROSS REFERENCE TO RELATED APPLICATIONS

This application claims priority from European patent application No. 11180461.3 filed on Sep. 7, 2011, all of which is incorporated herein by reference in its entirety for all purposes The present invention relates to expanded beads of low molecular weight polyalkylene terephthalate resins, to their recipes, to their preparation process and to the advantages of such beads.

BACKGROUND OF THE INVENTION

Cellular expanded articles formed by molding gas-charged and pre-expanded thermoplastic beads, the so-called particle foams, are widely utilized as thermal/sound/impact insulation, packaging, sport and cushioning materials for reasons of low density, better insulation characteristics, optimal energy absorption compared to solid polymers. The molding possibility of foamed beads in combination with their relatively small sizes enables either a production of simple configurated parts like blocks/plates or particularly, as another advantage in comparison to extruded semi-finished parts, a flexible forming of complex articles like e.g. 3D parts. In recent years, the use of molded particle foams have grown in automotive applications such as bumper impact absorber, seat cores, and floor mat leveling material.

Up to now, the widest materials of particle foams are represented by polystyrene (PS) and polyolefin (PP, PE or their copolymers). In general, expanded articles made of gas-charged PS beads are called as EPS, particle foams formed by polypropylene beads are known as EPP and the one made of polyethylene is named as EPE.

Expanded polystyrene (EPS) has taken its place nowadays as an important material in e.g. insulation, in construction applications and as a packaging material for a wide range of industrial applications and food industry. However, the method applied to produce EPS particle foams is rather complicated and expensive, mainly due to a number of, partially time-consuming, process steps involved (Eaves, D.: Handbook of Polymer Foams, Rapra Technology, 2004; Britton, R : Update on Mouldable Particle Foam Technology, Smithers Rapra, 2009):
  Production of unexpanded PS beads charged with an organic blowing agent and typically in size of 0.1-2.0 mm,
  Pre-expansion of said beads by using steam,
  Maturing of pre-expanded EPS beads for a period of several hours (often overnight or even longer),
  Molding and further expansion of matured beads.

Production of unexpanded polystyrene beads can be implemented either by suspension polymerization or by extrusion process. The predominant production route is via a suspension polymerization yielding a range of sizes of spherical beads. These are charged with a volatile organic blowing agent (often a mix of isomers of pentane) in the final stage before dewatering and drying, then followed by an organic coating to prevent agglomeration in the later processes.

The extrusion processes produce "microbeads" of uniform size directly from a melt of polystyrene (which may already contain a blowing agent) by use of an underwater micropelletiser. The polystyrene melt is supplied from an extrusion line, or even directly from a polymerization reaction carried out in a series of static mixers and melt pumps. The subsequent pre-expansion processing of PS beads is precisely same both to polymerized and extruded beads. The pre-expansion process involves using steam to heat and agitate the beads either in a batch or in a continuous process. As the beads are warmed by the steam to above the glass transition temperature of the material, they soften and the blowing agent boils at a large number of nucleation points, forming cells which grow so that the whole bead is foamed throughout, where the key variables in prefoaming are the steam pressure (temperature), the amount of dilution air and time.

The pre-expansion results yet in a vacuum inside the beads due to the rapid expansion of bead size. This may cause impairment or even collapse of cell structure inside the beads, in consequence of the generally insufficient mechanical strength of polystyrene. Thus, the pre-foamed EPS beads need to be matured, i.e. an atmospheric pressure inside the beads needs to be created by a permeation of air into them. In this process stage, the beads, now called as a "prepuff", are blown through pipes to large silos, where they are dried and discharged and allowed to mature for a period of several hours (often overnight or even longer), allowing them to cool and the cell walls to become rigid, able to support the negative pressure once the residual blowing agent has condensed. In the maturing progresses, air diffuses into the beads and they become stable enough to be processed further. It is well known that for a given bead type two or more expansion stages are necessary to achieve a lower final density. In case of multi-stage expansion, maturing is required between expansions.

Molding is also affected with steam—the prepuff beads are blown into an aluminum mold and steam applied through a number of small vents. This softens the beads and expands them further, using the residual blowing agent which remains in them after the prefoaming and ageing steps, in order to fuse adjacent beads together. Vacuum may be applied to the mold in the later stages, to help create a well fused surface on the molding. The distribution of steam between the mold halves can be adjusted to optimize the molding process, prevent distortion, etc. Cooling follows before the molding can be ejected and allowed to dry.

In addition to the complicated, time-consuming and expensive production processes, PS as a thermoplastic polymer shows some deficiencies like brittleness, insufficient impact strength, swelling when moist, too high compressibility, a generally low mechanical level, poor mounting properties, relatively high water vapor permeability etc. that are not favored when it comes to building insulation and its manufacturing (US 2011/0171456; Domininghaus, H.: Die Kunststoffe und ihre Eigenschaften, 6. Auflage, Springer Verlag, 2005). Furthermore, the lacking thermal stability or low temperature resistance resulted from the relatively low service temperature of either 65-80° C. for long-term or 80-90° C. for short-term as well as the poor resistance to chemicals such as organic solvents and fuel (Domininghaus, H.: Die Kunststoffe und ihre Eigenschaften, 6. Auflage, Springer Verlag, 2005) limit or even eliminate some applications of EPS in e.g. insulation for water heating appliances, automotive or microwave-related packaging.

Expanded polyolefin beads are another important particle foam in the beads family. It is known that the volume of moldable beads produced from polyolefins is very much smaller than that of polystyrene, even though foamed polyolefins have some significant property advantages (Domininghaus, H.: Die Kunststoffe und ihre Eigenschaften, 6.

Auflage, Springer Verlag, 2005). Among the particle foams of polyolefins, expanded polypropylene (EPP) plays a very important role, since EPP achieves an even better property profile compared to some other polymeric foams such as EPS, EPE as well as PU. Molded articles of EPP are generally characterized by properties like excellent impact energy absorption, good toughness, small residual deformation, better temperature stability, good chemical resistance and very low water vapor permeability.

EPP already applies within the area of packaging for industrial goods and in the automotive branch. A great variety of products, like protection for side impacts, sun visors, column and door covers, tool boxes and bumper inserts are made of this material.

However, common polypropylene grades normally feature a linear chain structure, having thus a sharp melting transition and low melt strength (particularly in extension), which is responsible for a cell structure being difficult to control, or even makes an expansion impossible. Production of EPP beads requires then often an introduction and use of an expensive high melt strength (HMS) resin which is a modified grade having a long chain branching (US 2011/0171456; Domininghaus, H.: Die Kunststoffe and ihre Eigenschaften, 6. Auflage, Springer Verlag, 2005).

Moreover, the processes for preparing and molding the EPP beads are complicated and comprised of (Eaves, D.: Handbook of Polymer Foams, Rapra Technology, 2004; Britton, R: Update on Mouldable Particle Foam Technology, Smithers Rapra, 2009):
  Converting the polymer, very often HMS polypropylene or a blend containing such HMS PP, into micropellets by e.g. extrusion,
  Impregnation of the PP micropellets with a hydrocarbon blowing agent such as propane at elevated temperature (e.g. 130-160° C.) and pressure for several hours,
  Expansion of the impregnated micropellets to form low density beads with particle size of some 4-5 mm after the pressure is released,
  Molding the expanded beads to final articles by compressing and fusing them with help of steam and backpressure,
  Post-ageing of expanded polypropylene (EPP) products in an autoclave, often required to achieve a full stability.

Disadvantageous in the process chain of EPP is the fact that the blowing agent impregnated into the beads can not be held there long at ambient pressures for later expansion. Instead, once impregnated with a blowing agent, the beads must be expanded immediately, or held under high pressure. Another disadvantage is the rapid outgasing of the blowing agent out of polypropylene beads, which is essentially complete already within a few days following the impregnation, i.e. the expanded beads need to be molded immediately or very soon after the expansion process. Further importantly, expanded beads have a high bulk, so that transporting them (and the finished products) is costly, or producing and molding the beads are required to take place on the same site. All this, use of chain branching grade, complex process, rapid outgasing and high transport costs etc., impedes the polyolefin bead foams in the marketplace (US 2011/0171456; Domininghaus, H.: Die Kunststoffe und ihre Eigenschaften, 6. Auflage, Springer Verlag, 2005).

Considered as one of the most disadvantageous weaknesses, PP is known to be very vulnerable to oxidative degradation under the influence of elevated temperature and/or sunlight because of the existence of tertiary carbon atoms. Such degradation is recognized as a free-radical chain reaction, which leads to chain scission. The addition of stabilizers has been widely used to depress this radical reaction. However, it is difficult to maintain the long-term performance of stabilizers for various reasons, including volatility (Pielichowski, K.,et al: Thermal Degradation of Polymeric Materials, Rapra Technology Limited, 2005). This weakness confines the outdoor applications or use of PP, including expanded PP beads, in an oxidative environment.

Polyalkylene terephthalates, belonging to the polyester family, particularly polyethylene terephthalate (PET) as a commodity thermoplastic resin, are mechanically strong in terms of strength, stiffness and hardness, chemical-resistant (much more resistant to most chemicals compared to PS), and show good thermal stability arisen from a high service temperature of either 100° C. for long-term or 200° C. for short-term and from a high Vicat softening temperature (VST/B120) of 185° C. (Domininghaus, H.: Die Kunststoffe und ihre Eigenschaften, 6. Auflage, Springer Verlag, 2005).

As described in details of (US 2011/0171456), PET or polyalkylene terephthalate have shown to be basically suitable and in some aspects even superior in comparison to EPS for e.g. building industry requirements:
  PET shows the compatibility in massive form with mineral based building materials such as concrete, clay or minerals etc.
  The stability and structural strength of massive PET have been used for the casting of concrete parts.
  The use of terephthalate foams in building and construction for windows sills or as insulation against heat bridging in the building industry are claimed in some patents. Such foams can bear some weight load of other construction elements.
  Foamed terephthalate can provide the structural integrity showing properties being resistant versus compression by weight (compression strength) in combination a) with resistance to creeping, flowing or destructive shearing (compressive modulus and shear strength) and b) with a reasonable level of remaining shear elongation.

A more important character of polyalkylene terephthalate such as PET is its less vapor permeation in comparison to PS (the most important foamable material for insulation till now) (Domininghaus, H.: Die Kunststoffe und ihre Eigenschaften, 6. Auflage, Springer Verlag, 2005), since the vapor content in a foamed polymer is known for its negative impact on the thermal conductivity. EPS may become less effective in the insulation property with the time of an outdoor utilization.

PET is well-known for the excellent gas barrier ability (Domininghaus, H.: Die Kunststoffe und ihre Eigenschaften, 6. Auflage, Springer Verlag, 2005), which results in a slow outgasing and is thus considered as a big benefit in comparison to PP. As mentioned above, expanded polypropylene has to be finally expanded and molded soon after the gas impregnation.

The above described property profile makes, therefore, polyalkylene terephthalate attractive as one of the materials suitable to be processed to gas-charged and expanded cellular beads, which can be formed by molding. Such expanded beads of PET can be termed E-PET, similar to EPS or EPP.

Among the polyalkylene terephthalate family, the low-viscous PET resins like bottle-grades, fiber-grade or post-consumer materials are pricely competitive and attractive for foaming process. Two PET grades now dominate the global market, i.e. fiber-grade PET and bottle-grade PET. These standard grades differ mainly in molecular weight or intrinsic viscosity (IV), respectively, optical appearance and the production recipes. Textile fiber-grade PET has an IV of between 0.55 and 0.67 dl/g, while bottle-grade PET, appearing "glass-clear" in the amorphous state, shows an IV of between 0.75 and 1.00 dl/g (Scheirs, J., et al: Modern Polyesters: Chemistry and Technology of Polyesters and Copolyesters, John Wiley & Sons, 2003).

However, expansion of polyalkylene terephthalate to produce low density cellular materials by using a physical blowing agent and extrusion process has been found to be a difficult process, mainly for the reason that these polymer resins are required to have appropriate rheological characteristics such as high melt strength and high (intrinsic and melt) viscosity.

EP0866089 describes e.g. an extrusion foaming of PET resins, which typically represents a free expansion. During the free expansion, the extrudate released from a die is depressured and the growing of initiated bubbles in size (extrudate expansion), forced by the vapor pressure of the blowing agent, which is generally higher than atmospheric pressure, is not restrained in the atmosphere, except by the melt strength of the molten resin. In case of a gas-charged melt mixture featuring insufficient melt strength, it is either not able to shape an extrudate or the built bubbles collapse when leaving the die exit. EP0866089 claims a foamability of PET resins which have to be solid state upgraded before, known as solid state polycondensation (SSP), in presence of pyromellitic dianhydride to reach an intrinsic viscosity of 0.85-1.95 dl/g, preferably between 1.00 and 1.95 dl/g. The intrinsic viscosity is in correlation with melt strength, thus essential for foamability of a polyester resin during the free expansion in a foam extrusion process. Both comparative examples of EP0866089 demonstrate that the starting resins of PET characterized by IV values of 0.80 and 0.92 dl/g are not foamable in a melt extrusion process, thus a free expansion, due to the lacking melt strength.

In addition, pre-expanded beads of polyalkylene terephthalates are not easily mold-formed due to their relatively high melting temperature and an equally high crystallinity under the temperature conditions necessary for a mold forming.

However, U.S. Pat. No. 6,306,921 claims expanded PET beads obtained from aromatic polyester resins having a melt strength of 1 cN at 280° C., a melt viscosity of more than 1500 Pa·s at 280° C. and with shear rate tending to zero, an intrinsic viscosity of more than 0.80 dl/g and a crystallization rate by heating at 120° C. for 5 minutes so that the resulting crystallinity is not higher than 15%. Resins having the indicated characteristics are obtained by solid state upgrading of the polymer in the presence of PMDA and in a temperature range of 150 to 210° C.

The preparation of the foamed beads is performed by hot cutting the foamed threads, by means of rotating blades at the output of an extrusion head having multiple holes, according to U.S. Pat. No. 6,306,921. Hence, the foaming process of PET resins disclosed both in EP0866089 and U.S. Pat. No. 6,306,921 belongs identically to the category of free expansion, which requires a high melt strength preventing the gas-charging melt from a cell collapse. As indicated in the description and comparative examples of EP0866089, foaming of PET resins with IV value of 0.92 dl/g or less is not possible in case of a free expansion. The claim of U.S. Pat. No. 6,306,921 that foamed PET beads are obtainable from polyester resins having an intrinsic viscosity of only more than 0.80 dl/g are, therefore, not convincing. This was also confirmed by the current invention (s. Comparative examples 3 and 4 of this invention), where a foaming and granulation method being similar to U.S. Pat. No. 6,306,921 were applied, and by the examples of U.S. Pat. No. 6,306,921, where PET copolymer with a melt strength of 150 cN at 280° C., a melt viscosity of 1800 Pa·s at 300° C. and an intrinsic viscosity of 1.25 dl/g (obtained by solid state upgrading a copolymer having an initial IV of 0.63 dl/g in presence of 0.4% PMDA) is foamed for production of the beads.

On the other hand, it is very much necessary to employ an extrusion head with tiny orifices to obtain small or micro-sized beads in case of a free expansion. The examples of U.S. Pat. No. 6,306,921 disclose the use of the multiholes having a diameter of 0.1 mm The tiny hole diameter causes, however, a very high shear rate: With 90 kg/h throughput through 24 holes, the average shear rate is estimated to be over 450'000/s, assuming even a melt density of about 1400 kg/m³ in the temperature range of 260-300° C. and at a melt pressure of 110 bar. The above estimation illustrates how much the melt mixture may be sheared or shear degraded at the extrusion head during the bead production with hot cutting. This again requires use of polymer resins having high viscosity (possibly IV>1.0 dl/g) in the bead preparation of U.S. Pat. No. 6,306,921.

Besides, the upgrading process is indeed a complicated and highly cost-/time-consuming procedure: The granules containing PMDA undergo a solid state polycondensation at 210° C. for 10 h (in general, 24 h may be necessary to upgrade polyester resins from an IV below 0.80 dl/g to 1.25 dl/g).

U.S. Pat. No. 6,306,921 further claims the foamed PET beads characterized by a density between 30 and 500 kg/m3, a melt strength of more than 1 cN at 280° C., a melt viscosity of more than 1500 Pa·s at 280° C. etc.

However, the E-PET beads of U.S. Pat. No. 6,306,921 show disadvantageously a poor cell structure according to the inventors: While the outermost layer is characterized by microcells of 50 to 500 μm, the center part of the beads features a macrocell structure with cell sizes of a few millimeters.

SUMMARY OF THE INVENTION

The main object of the current invention is to investigate the possibility of extrusion expanding low-molecular polyalkylene terephthalates for production of gas-charged beads, which can be either used as loose particles in application of e.g. packaging or insulation, or molded to form articles or semi-finished parts for applications mentioned above. The starting resins of polyalkylene terephthalates are rheologically characterized by low (intrinsic and melt) viscosity in correlation with low molecular weight.

DESCRIPTION OF THE INVENTION

The processability and application profile of polyalkylene terephthalates is strongly affected by the molecular structure of the resins. The intrinsic viscosity values of such materials serve as measure for the average molecular weight of alkylene terephthalate polymers (Domininghaus, H.: Die Kunststoffe und ihre Eigenschaften, 6. Auflage, Springer Verlag, 2005). It is well-known that polyalkylene terephthalates which are free expandable in e.g. melt extrusion process are characterized by their high molecular weight. As convincingly demonstrated through the comparative examples of EP0866089, PET resins having an IV below 1.0 dl/g cannot be foamed by means of a free expansion.

In the current invention, alkylene terephthalate polymers characterized by an IV less than 1.0 dl/g are considered as polymers of low molecular weight. As determined by (Scheirs, J., et al: Modern Polyesters: Chemistry and Technology of Polyesters and Copolyesters, John Wiley & Sons, 2003), the number-average molecular weight $\overline{M_n}$ of bottle-grade PET ranges from 24'000 to 36'000 g/mol, which refers to an IV of between 0.75 and 1.0 dl/g. Thus, alkylene terephthalate polymers with an IV below 1.0 dl/g and a number-average molecular weight $\overline{M_n}$ less than 36'000 g/mol are defined as low molecular weight polyalkylene terephthalates in this invention.

It has been surprisingly found that it is possible to obtain gas-charged, expanded beads of low molecular weight polyalkylene terephthalates with or without help of chain-extending ingredients. The expanded alkylene terephthalate polymer beads can be either used as loose particles in application of packaging or insulation or molded to form articles or semi-finished parts for applications in building industry, sport, packaging and automotive fields. It has been further found that the addition of a multifunctional chain-extending compound comprising one or more chain-extending/branching ingredients into the foaming extruder improves the melt strength during the expansion extrusion, decreases the cell size and further homogenizes the cell structure. The produced beads exhibit even a higher intrinsic and a higher melt viscosity, thus a higher molecular weight, compared to the initial resin. A better property profile such as, but not exclusively, compression strength/modulus, shear strength/modulus and even shear elongation, can be expected.

The polymer beads are prepared in a process basically comprising 1) melt blending the dried polymer resin with nucleation agent and, in case of molecular upgrading, multifunctional compound in an extruder, preferably a twin-screw extruder, 2) mixing the melt with an injected physical blowing agent, 3) extruding the melt mixture through a multihole head, 4) pelletizing the melt threads to beads under water by rotating blades and 5) drying and bagging the gas-charged, expanded beads.

The beads preparation equipment consists, in general, but not exclusively, of an extruder, a static melt mixer/cooler, multihole strand die and an underwater pelletizing system.

All types of foaming extruder such as single-screw, (co-, counter-rotating or conical) twin-screw extruder as well as tandem extrusion line composed of a primary (melting/mixing) and a secondary (mixing/cooling) extruder can be used to process the melt mixture. The injection port for blowing agent is mounted into the extruder, which is the primary extruder in case of a tandem extrusion line, after the melting zone. The extruder can be equipped with side feeding systems for addition of multifunctional chain-extending compound or other additives/modifiers. The primary extruder of the tandem extrusion line can be a single-screw or twin-screw extruder, while the secondary cooling extruder is mostly comprised of a single-screw extruder.

A static melt mixer/cooler, tempered with oil, can be employed between the extruder and the strand die to cool down the melt and further homogenize the melt mixture. Very often, the static mixer can be combined with the function of a melt cooler, therefore, the use of the term "melt mixer/cooler". It is well-known and has been proven in the current invention that a sufficient melt mixing and cooling favors a further density reduction of expanded materials due to a decreased gas diffusion out of the melt mixture and contributes to a homogeneous cell structure.

Any strand die suitable to form threads can be applied to produce the beads. However, the smaller the hole diameter, the easier tend the die orifices to be frozen and closed by solidified material, when applying an underwater pelletizing system. It has been found in this invention that alkylene terephthalate polymer beads with a particle size of slightly less than 1.8 mm—measured immediately after the extrusion—can be extruded despite the die swelling, when processing the material without gas-loading and within the normal process window by means of a multihole die with a orifice diameter of 1.8 mm, i.e. a polymer film is solidified at the inside wall of the die hole, building an insulation layer. With help of the strand die having an orifice diameter of 1.5 mm or bigger, expanded beads can be manufactured without a die freezing, and small-sized beads are possible in the current invention.

The orifices having an inside diameter smaller than 1.5 mm are also suitable for production of expanded beads, in case that every orifice is comprised of a nozzle insert which is insulated at its outside with an insulation gap and at its front surface with an insulation material in form of O-ring as disclosed in DE10 2010 026 926. This insulation gap and the O-ring reduce the heat transfer from the hot melt to cooled metal being in contact with the cooling water, as result keeping the melt warmer and preventing the die from a freezing.

The key point of this invention is the use of an underwater pelletizing system comprising basically, but not exclusively, rotating cutter blades, a water box, a piping system and a centrifugal pellet dryer. The die exit surface and the blades are located in the water box, where a backpressure of the cooling water is adjustable up to 10 bar. The cooling water can be tempered to ensure that the cooling has a temperature always below 90° C., preferably in a range between 20 and 80° C. The melt threads coming out of the orifices are immediately cut by the blades in the water box. The tempered water continuously flows through the water box to cool and solidify the beads. The water cooling reduces the temperature of the beads rapidly and efficiently and solidifies their surface immediately, resulting in an amorphous compact surface and a low crystallinity of the beads. The skin of the beans is characterized by a compact layer with a thickness below 120 µm.

The most important advantage of the immediate water cooling can be seen in the fact that the gas-charged threads and the expanded beads are prevented from a cell collapse, also in case of an initially insufficient melt strength, since the rapid solidification and cooling of the small-size beads ensure a mechanical strength of the cell walls in the water box. An unlimited growing of the bubbles is consequently not possible. By using the immediate water cooling combined with the backpressure in the water box, the production of the polyalkylene terephthalate beads is no more based on an unrestrained free expansion, but related to a controlled expansion in this invention.

The amorphous surface and the low crystalline beads of polyalkylene terephthalates, particularly polyethylene terephthalates, tend to be sticking and bridging at a temperature above their glass transition temperature, in favor of a quick and firm fusing of the expanded beads.

The bead slurry is conveyed from the water box through the pipe system to a centrifugal dryer, where the water is removed from the amorphous beads surface, followed by transporting the relatively dry beads to a collector for bagging finally.

In addition to the amorphous surface and compact skin of the beads, it has also been found that the backpressure in the water box affects the swelling or expansion ratio of the melt threads and beads. Without changing any other process parameters, a lower backpressure leads to beads having a bigger particle size. Preferably, a water pressure in a range of 0.5-8 bar can be applied. Therefore, the ability of a post-expansion in a later e.g. molding process can be imparted to the beads produced under a relatively high backpressure.

The prepared polyalkylene terephthalate beads show a closed composite structure comprising a cellular core encapsulated by a compact skin The cellular core consists further of 1) a microcellular layer with a thickness of not higher than 100 µm, being adjacent to the skin and having a cell size below 15 µm, and 2) a homogeneously structured, fine-cell center part of the beads showing a cell size varying below 400 µm, mainly between 30 and 300 µm. The compact skin has a thickness below 120 µm, mostly between 30 and 80 µm.

The particle size of the expanded beads ranges from 1 to 20 mm, mostly below 15 mm. Enabled by an immediate water cooling of the threads and beads, the expanded and gas-charged beads show, particularly at the beads surface, a very low crystallinity degree, lower than 10%. The beads density, more precisely defined as specific gravity, is dependent on the type and content of physical blowing agent. A density of less than 400 kg/m$^3$ according to DIN ISO 1183 is possible in the current invention.

Moreover, the expanded beads show, after a rheological analysis, an intrinsic viscosity of 0.69 dl/g or more according to ASTM D4603-03 and a melt viscosity with shear rate tending to zero, therefore written as $\eta_o$, of higher than 300 Pa·s according to ASTM D4440 at 280° C.

The expanded beads of polyalkylene terephthalate, even after 4 weeks of a storage at ambient temperature, can be formed to particle foams in a mold equipped with vents at walls for inflowing of steam, air or inert gases. The cell structure and compact skin of the beads remain undamaged after the molding process, while the adjacent beads are fused together under implication of heating medium in a temperature range of 140 to 220° C.

Any polyalkylene terephthalate resin, particularly polyethylene terephthalate resin, can be processed for production of expanded beads, even, not exclusively, without a molecular upgrading through application of SSP or/and PMDA before the preparation process.

Polyethylene terephthalate resin is preferably used for production of the expanded beads, including those derived from terephthalic acid, isophthalic acid, naphthalenedicarboxyl acid, cyclohexanedicarboxylic acid and the like or the alkyl esters. Particularly preferred is DMT- or PTA-based PET homo- and copolymers. Foaming of PET-G (glycol-treated PET) is also possible.

Preferred polyethylene terephthalate is bottle-grade PET resin—used mainly for production of beverage bottles—having a number-average molecular weight ranging from 24'000 to 36'000g/mol and an IV of between 0.75 and 1.00 dl/g.

Another preferred polyethylene terephthalate is fiber-grade PET resin—used mainly in textile fiber industry—having a number-average molecular weight ranging from 15'000 to 20'000 g/mol and an IV of between 0.55 and 0.67 dl/g.

Another preferred polyethylene terephthalate is PET resin used mainly for packaging films or other tapes and having as a standard grade an IV of 0.64 dl/g.

Another preferred polyethylene terephthalate is post-consumer PET resin in form of flakes, powder, agglomerate or granules—obtained by recycling any waste stream containing PET—having an IV mostly, but not exclusively, below 1.0 dl/g.

The term "post-consumer" is defined as material being brought back into the process—i.e. being recycled—after its prior processing and/or use, e.g. as PET bottles, PET articles, polyester scraps, recycling polyesters. The waste stream is collected from household, industry scraps or used bottles. After shredding, the waste is produced to PET flakes by pre-separating, washing, separating and drying.

The post-consumer PET flakes can be foamed directly or after a granulating process. In later case, the post-consumer PET is provided in form of granules/chips. The post-consumer PET resin may contain polyolefin, polyamide, PVC or other contaminants in a total amount of, in general, less than 5.0 wt %.

All alkylene terephthalate polymers mentioned above can be used either in form of a single polymer or as a mixture thereof in form of granules, agglomerates, powders or flakes.

It is further possible to process a polymer blend containing polyalkylene terephthalate to produce such expanded beads. Possible blend partners can be selected from, but not exclusively, PEN, PC, LLDPE, LDPE, PP, SAN, SEBS, PSU, PES, PA, PPE, LCP, PMMA or a mixture thereof.

The multifunctional chain-extending compound used in the current invention is comprised of one or more chain-extending/branching ingredients preferably selected from a group consisting of tetracarboxylic dianhydride, polyepoxides, oxazolines, oxazines, acyllactams and antioxidant comprising sterically hindered phenolic end groups or mixtures thereof. The most important multifunctional chain-extending compound used in this invention consists of tetra or polycarboxylic dianhydride selected from a group containing at least two anhydride per molecule such as pyromellitic dianhydride, benzophenone dianhydride, 2,2-bis (3,4-dicarboxyphenyl) propane dianhydride, 3,3', 4,4'-biphenyltetracarboxylic acid dianhydride, bis (3,4-dicarboxyphenyl) ether dianhydride, bis (3,4-dicarboxyphenyl) thioether dianhydride, bisphenol A bisether dianhydride, 2,2-bis (3,4-dicarboxylphenyl) hexafluoropropane dianhydride, 2,3,6,7-naphtalene-tetracarboxylic acid dianhydride, bis (3,4-dicarboxyphenyl) sulfone dianhydride, 1,2,5,6-naphthalene-tetracarvoxylic acid dianhydride, 2,2',3,3'-biphenyltetracarvoxylic acid dianhydride, hydroquinone bisether dianhydride, bis (3,4-dicarboxyphenyl) sulfoxide dianhydride, 3,4,9,10-perylene tetracarboxylic acid dianhydride and blends thereof.

Preferred tetracarboxylic dianhydrides are those containing aromatic rings. Particularly preferred tetracarboxylic dianhydrides are pyromellitic dianhydride, 3,3', 4,4' benzophenonetetracarboxylic acid dianhydride and mixtures thereof.

Another important multifunctional compound is polyepoxides having at least two epoxy groups per molecule. Typical polyepoxides are diepoxy compounds, ethylene glycol diglycidyl ether, polyethylene glycol diglycidyl ether, propylene glycol diglycidyl ether, polypropylene glycol diglycidyl ether, polytetramethylene glycol diglycidyl ether, glycerol diglycidyl ether, diglycidyl phthalate, diglycidyl terephthalate, dicyclopentadiene diepoxide, 3,4-epoxy-6-methylcyclohexyl-3,4-epoxy-6-methylcyclohexanecarboxylate, 3,4-epoxycyclohexyl-3,4-epoxycyclohexanecarboxylate and vinylcyclohexane diepoxide etc.

Since the antioxidant comprising sterically hindered phenolic end groups in combination with a tetracarboxylic dianhydride leads to a significant increase of molecular weight of polyalkylene terephthalate during the heating and mixing process, thus enhancing the extensional viscosity remarkably, a primary antioxidant such as sterically hindered phenolic antioxidant: 4-((3,5-bis((4-hydroxy-3,5-ditert-butyl-phenyl)methyl)-2,4,6-trimethyl-phenyl)methyl)-2,6-ditert-butyl-phenol, sterically hindered hydroxyphenylalkylphosphonic acid ester or half ester can be also applied in combination with tetracarboxylicdianhydrides in the current invention.

Beside above mentioned antioxidants, particularly suitable sterically hindered phenolic antioxidants selected from the group of so-called primary antioxidants include for instance: Pentaerythritol tetrakis(3-(3,5-di-tert-butyl-4-hydroxyphenyl)propionate), thiodiethylene bis[3-(3,5-di-tert-butyl-4-hydroxyphenyl)propionate], octadecyl-3-(3,5-di-tert.butyl-4-hydroxyphenyl)-propionate, N,N' -hexane-1,6-diylbis(3-

(3,5-di-tert- butyl-4-hydroxyphenylpropionamide)), 1,3,5-tris(3,5-di-tert-butyl-4-hydroxybenzyl)-1,3,5 -triazine-2,4,6 (1H,3H,5H)-trione.

Particularly preferred sterically hindered phenolic antioxidant is selected from hydroxyphenyle propionate and hydrobenzyl groups such as: 4-((3,5-bis((4-hydroxy-3,5-di-tert-butyl-phenyl)methyl)-2,4,6-trimethyl-phenyl)methyl)-2,6-ditert-butyl-phenol or calcium bis(monoethyl(3,5-di-tert-butyl-4-hydroxylbenzyl)phosphonate).

Furthermore, an oxazoline for further improvement of foamability of the polyesters can also be composed in the recipe of the multifunctional compound comprising mixture of sterically hindered phenolic antioxidant and tetracarboxylic dianhydride. Mixtures of different oxazoline can be applied in the concentrate recipes. Preferred oxazoline is the monooxazoline for instance 2-,3- or 4-oxazoline as well as bisoxazoline. Particularly preferred bisoxazoline is 1,3-phenyl bisoxazoline and 1,4-phenyl bisoxazoline. Trioxazoline can be alternatively integrated into the recipe of said concentrates.

To be able to produce the beads featuring a fine/uniform cell structure, a nucleation agent or a mixture containing more than one nucleates is necessary. Commonly used nucleate types are talc, $TiO_2$, MgO, $BaSO_4$, $SiO_2$, $Al_2O_3$, CdO, ZnO, mica filler's earth, diatomaceous earth or the like. Chemical, physical blowing agents or a mixture thereof can act as nucleates too.

In addition, the recipe for production of expanded beads can contain further additives such as athermanous particles such as carbon black, graphite or metal powder (particularly aluminum), process/thermal stabilizers, fluor-polymers, UV stabilizers or flame retardants etc.

In the beads extrusion process, a physical blowing agent is preferred for expansion of alkylene terephthalate polymers to obtain a density below 400 kg/m$^3$. The physical blowing agent is typically selected from carbon dioxide ($CO_2$), Nitrogen ($N_2$), ketons, hydrofluorocarbon, a hydrocarbon (such as n-hexane, n-octane, iso-butane, isopentane, cyclopentane and n-heptane) or a mixture of above gases.

Heating medium used for molding of the expanded beads can be selected from superheated steam (having a temperature higher than the water boiling point), air, an inert gas such as nitrogen and likewise. The heating medium acting to the expanded beads in the mold is heated to a temperature in a range of 140-220° C. and for a time of from a few seconds to a few minutes.

The expanded beads obtained from low molecular weight polyalkylene terephthalate, particularly from polyethylene terephthalate, can be either used as loose particles or molded to form articles or semi-finished parts. The advantageous property profile of the beads in their superior mechanical strength with excellent compression and shear strength/modulus, high temperature resistance, resistance to chemicals and resistance to creeping, flowing or destructive shearing, combined with the light weight, provides a number of advantages in applications such as, but not exclusively, building/construction industry, transport, railway vehicles, sport, packaging or automotive etc.

A further advantage of this kind of products is based on the less vapor permeation compared to PS—the most important foamable material for insulation till now. This results in a longer-term retaining of thermal insulation property than EPS, essential for use as insulation material in building and construction.

The compatibility with mineral based building materials such as concrete, clay or minerals etc. can be considered as another advantage of expanded beads made of alkylene terephthalate polymers for the applications in building or construction industry. Another advantage of the invented beads is related to their high short- and long-term service temperature, which enables either a post-process at a temperature up to 200° C. or microwave applications, where EPS or EPP cannot compete.

Another advantage of the invented beads is related to the barrier property of polyalkylene terephthalate, particularly PET, preventing a quick outgasing of the physical blowing agent from the polymer. This enables storage of gas-charged expanded beads for weeks and a later process after the storage.

Another important advantage of the current invention refers to the fact that the low molecular weight polyalkylene terephthalate resins having an IV of less than 1.0 dl/g can be expanded to gas-charged beads without a time-/cost-consuming SSP upgrading before.

Another advantage of the current invention is related to the fact that the low raw material price of e.g. PET resins, regardless of bottle- or fiber-grade, makes expanded PET beads economically more attractive than EPS or EPP.

Another advantage of this invention is based on the fact that post-consumer alkylene terephthalate resins can be expanded to gas-charged beads without a SSP upgrading before. This not only enables a further cost-saving, but is also beneficial in environmental aspect. A very important advantage of the current invention is related to the fact that the process chain comprising extrusion expanding of polyalkylene terephthalate resins and molding the expanded beads is characterized by the simple process procedure, i.e. neither a coating of the beads, nor a pre-expansion of the gas-charged beads in a vessel, nor a maturing of the pre-expanded beads and nor a post-aging, all time- and/or cost-consuming, is necessary. Consequently, the alkylene terephthalate beads show a further cost advantage in comparison to EPS or EPP and are able to replace or at least provide an attractive alternative to EPS or EPP technically and/or economically.

Another advantage of the invented beads is related to their compact skin, which is considered to have a higher mechanical strength and a better impact resistance in comparison to beads having only cellular structure of e.g. U.S. Pat. No. 6,306,921. The compact skin further decelerate the outgasing of the blowing agent, in favor of a longer storage of the gas-charged beads.

Another advantage of the invented beads is related to their fine, closed and uniform cell structure, which provides the structural integrity showing superior properties in mechanical strength or thermal insulation.

Another advantage of the invented beads is related to their very amorphous surface, resulted from the immediate water cooling, which promotes a reliable and firm fusing of the beads in a mold.

Another advantage of this invention is related to the fact that the expansion of the beads can be affected by the back-pressure in the water box. This further contributes to a controlled expansion of gas-loaded beads and enables a post-expansion, i.e. a further density reduction, of the gas-charged beads in a later process such as molding and saves e.g. the transport costs.

Another advantage of the current invention is related to use of the important multifunctional chain-extending compound during the expansion process, which can increase the molecular weight, melt strength and viscosity of the resins during the process, so that the obtained beads show even a higher average molecular weight, a higher IV or a higher melt viscosity than the polymer resins before the melt process, resulting in a significant improvement of material properties and cell structure.

The resins constituting the expanded beads and the initial polymers are rheologically analyzed by means of intrinsic viscosity and melt viscosity in this invention.

Intrinsic viscosity of polyalkylene terephthalate resins and their expanded beads is measured by means of a solution mixture comprising phenol:tetrachloroethane=60:40 in weight at 30° C. according to ASTM D4603-03.

Melt viscosity is determined in a shear rate range of 0.1-100/s at 280° C. according to ASTM D4440. Extrapolation of the shear rate-viscosity curve toward shear rate of 0/s leads to the melt viscosity value $\eta_0$ at shear rate zero, which is a number being characteristic for the melt viscosity of a melt at a given temperature.

Due to the compact skin of the invented beads, the average density of the beads can be measured by testing individual beads according to DIN ISO 1183.

EXAMPLES OF THE INVENTION

This invention is illustrated by the following examples given for illustrative purpose.

Comparative Example 1

See comparative example 1 of EP0866089

Comparative Example 2

See comparative example 2 of EP0866089

Comparative Example 3

In this example, a co-rotating twin screw extruder having a screw diameter of ϕ75 mm and L/D=32, followed by a static mixer and a vertical strand die, was applied. The strand die consisted of 8 orifices distributed along a circumference and having a hole diameter of 0.5 mm. 2 blades were arranged touching the flat exit surface of the die. The melt threads were hot cut by the rotating blades and propelled by centrifugal force of the blades into the cooling water.

PET copolymer with IV=0.84 dl/g according to ASTM D4603-03, after drying at 140° C. for 14 h, and 0.65% of talc by weight of the total throughput were continuously fed into the extruded at a throughput of 40 kg/h. In addition, 1.5% of cyclopentane as blowing agent by weight of the total throughput was injected into the extruder and mixed with the polymer matrix. The melt mixture was homogenized in extruder and extruded through the strand die to be formed to melt threads. The threads were cut by the rotating blades and propelled into the cooling water which was tempered at a temperature of 20-30° C.

The process parameters are described as below:
Extruder:
Temperature of feeding zone: 120-260° C.
Temperature of melting zone: 280-285° C.
Temperature of metering zone: 260-285° C.
Temperature of static mixer: 240-260° C.
Temperature of die: 280-295° C.
Screw rotating speed: 10-30 rpm
Granulation System:
Blade rotating speed: 1000-3000 rpm
Water temperature: 20-30° C.
No gas-containing granules could be produced.

Comparative Example 4

The beads preparation of comparative example 3 was repeated with the difference that the blades were removed and a foaming of the melt threads was carried out without a granulation to observe the foaming behavior of the recipe of comparative example 3 only. No foaming was possible.

Comparative Example 5

The beads preparation of comparative example 4 was repeated with the difference that the orifices of the die had a diameter of 0.2 mm instead of 0.5 mm were applied.
No foaming was possible.

Example 1

A co-rotating twin-screw extruder having a screw diameter of ϕ27 mm and L/D=40, followed by a static mixer and a strand die, was applied. The strand die consisted of 4 orifices having a diameter of 1.8-2.0 mm. The flat exit surface of the die was adapted with an underwater pelletizing system comprising basically two rotating cutter blades, a water box, a piping system and a centrifugal pellet dryer. The die exit surface and the blades were located in the water box, where a backpressure of the cooling water was adjustable. The cooling water could be tempered. The melt was extruded through the strand die, forming 4 threads. The threads were immediately cut by the blades in the water box. The tempered water was continuously flowing through the water box to cool and solidify the beads. The bead slurry was conveyed from the water box through the pipe system to a centrifugal dryer, where the water was removed from the gas-loaded beads, then transported to a collector for bagging.

9 kg/h of virgin polyethylene terephthalate copolymer—a bottle-grade—having an IV of 0.80 dl/g according to ASTM D4603-03 and a melt viscosity $\eta_0$ of 700 P·s according to ASTM D4440 at 280° C. were continuously fed into the twin-screw extruder, after drying at 140° C./12 h, where the PET resin was melt blended with 0.65% of talc by weight of the total throughput. 3.0% of cyclopentane as blowing agent by weight of the PET resin were injected into the extruder and mixed with the polymer matrix. The melt mixture was homogenized in extruder and extruded through the strand die. The threads were cut by the rotating blades and immediately cooled and solidified by cooling water in the water box. After removal of the water and drying, the gas-loaded PET beads were bagged.

The process parameters are sumerized as following:
Extruder:
Temperature of feeding zone: 120-260° C.
Temperature of melting zone: 260-285° C.
Temperature of metering zone: 260-285° C.
Temperature of mixing zone: 260-285° C.
Temperature of static mixer: 240-280° C.
Temperature of die: 280-300° C.
Screw rotating speed: 20-100 rpm
Underwater Pelletizing System:
Blade rotating speed: 1000-4000 rpm
Water temperature: 20-90° C.
Backpressure in water box: 0.5-8 bar The obtained beads were analysed and rheologically characterized, leading to following results
Density: 350 kg/m³
Cellular core: uniform, closed cells with a cell size varying from 100 to 300 μm (microcellular structure in the boundary layer adjacent to the skin)
Beads skin: compact skin with a thickness about 30-60 μm
Intrinsic viscosity: 0.69 dl/g
Melt viscosity $\eta_0$: 310 P·s The density of individual beads was measured according to DIN ISO 1183 (This was possible due to the compact skin of beads). Similar to above mentioned testing methods, the IV of the beads was analysed according to ASTM D4603-03 and the melt viscosity $\eta_0$ according to ASTM D4440 at 280° C.

Example 2

The beads preparation of Example 1 was repeated with the difference that 0.2% pyromellitic dianhydride by weight of the PET resin were added into the extruder and 4% instead of 3% cyclopentane by weight of the PET resin was injected into the extruder.

The produced beads had the following characteristics:
Density: 190 kg/m³
Cellular core: uniform, closed cells with a cell size varying from 80 to 150 μm (microcellular structure in the boundary layer adjacent to the skin)
Beads skin: compact skin with a thickness about 40-70 μm
Intrinsic viscosity: 0.86 dl/g
Melt viscosity $\eta_0$: 1600 Pa·s Example 3

The beads preparation of Example 1 was repeated with the difference that 0.15% Triglycidylisocyanurate by weight of the PET resin was added into the extruder and 4.0% instead of 3% cyclopentane by weight of the PET resin was injected into the extruder.

The produced beads had the following characteristics:
Density: 175 kg/m³
Cellular core: uniform, closed cells with a cell size varying from 80 to 120 μm (microcellular structure in the boundary layer adjacent to the skin)
Beads skin: compact skin with a thickness about 40-70 μm
Intrinsic viscosity: 0.90 dl/g
Melt viscosity $\eta_0$: 1800 Pa·s Example 4

The beads preparation of Example 1 was repeated with the difference that 4% masterbatch disclosed in Example 3 of EP2253659 by weight of the total melt throughput were added into the extruder and 4.5% instead of 3% cyclopentane by weight of total melt throughput was injected into the extruder.

The produced beads had the following characteristics:
Density: 90 kg/m³
Cellular core: uniform, closed cells with a cell size varying from 80 to 100 μm (microcellular structure in the boundary layer adjacent to the skin)
Beads skin: compact skin with a thickness about 35-60 μm
Intrinsic viscosity: 1.00 dl/g
Melt viscosity $\eta_0$: 2250 Pa·s Example 5

The beads preparation of Example 1 was repeated with the difference that 4% masterbatch disclosed in Example 2 of EP2253659 by weight of the total melt throughput were added into the extruder and 3% propane/butane mixture (propane:butane=30:70 in weight) instead of 3% cyclopentane by weight of total melt throughput was injected into the extruder.

The produced beads had the following characteristics:
Density: 270 kg/m³
Cellular core: uniform, closed cells with a cell size varying from 60 to 100 μm (microcellular structure in the boundary layer adjacent to the skin)
Beads skin: compact skin with a thickness about 40-70 μm
Intrinsic viscosity: 0.87 dl/g
Melt viscosity $\eta_0$: 1650 Pa·s Example 6

The beads preparation of Example 1 was repeated with the difference that 4.5% masterbatch disclosed in Example 3 of EP2253659 by weight of the total melt throughput were added into the extruder and 3.5% butane instead of 3% cyclopentane by weight of total melt throughput was injected into the extruder.

The produced beads had the following characteristics:
Density: 170 kg/m³
Cellular core: uniform, closed cells with a cell size varying from 20 to 40 μm (microcellular structure in the boundary layer adjacent to the skin)
Beads skin: compact skin with a thickness about 50-80 μm
Intrinsic viscosity: 0.92 dl/g
Melt viscosity $\eta_0$: 2100 Pa·s Example 7

The beads preparation of Example 1 was repeated with the difference that 1) a post-consumer PET resin instead of virgin PET copolymer was foamed, 2) 0.5% pyromellitic dianhydride by weight of the PET resin were added into the extruder and 3) 2.6% instead of 3% cyclopentane by weight of the PET resin was injected into the extruder.

The post-consumer PET resin was obtained by recycling a waste stream from household.

The recycling process was comprised of
Shredding, pre-separating, washing and final separating the waste stream to produce PET flakes
Extrusion granulating the PET flakes.

The post-consumer PET was rheologically tested and characterized by an IV of 0.63 dl/g according to ASTM D4603-03 and a melt viscosity $\eta_0$ of 130 Pa·s according to ASTM D4440 at 280° C., The produced beads had the following characteristics:
Density: 200 kg/m³
Cellular core: uniform, closed cells with a cell size varying from 100 to 300 μm (microcellular structure in the boundary layer adjacent to the skin)
Beads skin: compact skin with a thickness about 40-75 μm
Intrinsic viscosity: 0.72 dl/g
Melt viscosity $\eta_0$: 700 Pa·s Example 8

160 g of beads of Example 4, after 4 weeks of storage at ambient temperature, were fed into a mold having a cavity of a dimension 200×200×50 mm and equipped with 7×7 vents for steam inflow.

The beads were heated in the mold with pre-heated steam at 160° C. for 4 minutes and formed to particle foam with a density of 80 kg/m³.

The invention claimed is:

1. Expanded beads of a polyalkylene terephthalate resin, wherein the expanded beads comprise a cellular core encapsulated by a compact skin, wherein the cellular core comprises a fine-cell center and a microcellular layer,
wherein the compact skin has a thickness between 30 μm and less than 120 μm;
wherein the microcellular layer is adjacent to the compact skin and has a thickness not higher than 100 μm and a cell size below 15 μm;
wherein the fine-cell center has a cell size below 400 μm, and
wherein the expanded beads have an intrinsic viscosity of at least 0.69 dl/g according to ASTM D4603-03, a melt viscocity $\eta_0$ of more than 300 Pa·s according to ASTM D4440 at 280° C. and a density 400 kg/m³ according to DIN ISO 1183.

2. The beads according to claim 1, wherein the particle size ranges from 1 to 20 mm.

3. The beads according to claim 1, wherein the crystallinity degree of the beads is lower than 10%.

4. The beads according to claim 1, wherein the polyalkylene terephthalate resin before the expansion process has an intrinsic viscosity of below 1.0 dl/g according to ASTM D4603-03.

5. The beads according to claim 1, wherein the polyalkylene terephthalate is a polyethylene terephthalate.

6. The beads according to claim 5, wherein the polyethylene terephthalate is selected from a bottle-grade PET resin having an IV of between 0.75 and 1.00 dl/g according to ASTM D4603-03, a fiber-grade PET resin having an IV of between 0.55 and 0.67 dl/g according to ASTM D4603-03 or a post-consumer PET resin having an IV below 1.0 dl/g according to ASTM D4603-03 or a mixture thereof.

7. The beads according to claim 1, wherein a multifunctional chain-extending compound is used and selected from tetracarboxylic dianhydride, polyepoxides, oxazolines, oxazines, acyllactams or sterically hindered phenolic antioxidant or a mixture thereof.

8. A process for preparation the expanded beads according to claim 1, comprising an extrusion foaming of polyalkylene terephthalate and pelletizing of the melt threads.

9. An underwater pelletizing process according to claim 8, wherein the melt mixture released from the die orifices is pelletized by rotating blades in a water box, where the cooling water is tempered at a temperature below 90° C. and a water backpressure below 10 bar is applied.

10. Articles or semi-finished parts containing the expanded beads according to claim 1.

\* \* \* \* \*